July 28, 1964  F. N. TACCOGNA  3,142,172

VIBRATION TESTING APPARATUS

Filed July 28, 1960  5 Sheets-Sheet 1

INVENTOR.
FRANK N. TACCOGNA
BY Thomas S. MacDonald
ATTORNEY

July 28, 1964  F. N. TACCOGNA  3,142,172
VIBRATION TESTING APPARATUS
Filed July 28, 1960  5 Sheets-Sheet 2

INVENTOR.
FRANK N. TACCOGNA
BY Thomas S. MacDonald
ATTORNEY

July 28, 1964    F. N. TACCOGNA    3,142,172
VIBRATION TESTING APPARATUS

Filed July 28, 1960    5 Sheets-Sheet 3

INVENTOR.
FRANK N. TACCOGNA
BY Thomas S. MacDonald
ATTORNEY

INVENTOR.
FRANK N. TACCOGNA
BY Thomas S. Macdonald
ATTORNEY

*INVENTOR.*
FRANK N. TACCOGNA
BY Thomas S. MacDonald
ATTORNEY

United States Patent Office 3,142,172
Patented July 28, 1964

3,142,172
VIBRATION TESTING APPARATUS
Frank N. Taccogna, Downey, Calif., assignor to
North American Aviation, Inc.
Filed July 28, 1960, Ser. No. 45,895
7 Claims. (Cl. 73—71.6)

This invention relates to a vibration testing apparatus and more particularly to a vibrating machine having a conically shaped drive system for simulating vibration frequencies (5 to 300 c.p.s.) to which components will be subjected when put into service.

Manufactured components and in particular, electrical devices for use in modern day missiles and other power operated devices, must be subjected to vibrational environments and shocks to determine the damaging resonant frequencies at which the component will ultimately fail. The object of such a machine of this general character is to simulate in a laboratory the conditions which exist when the component is put into actual use. The recent surge of interest with regards to high frequency (5 to 3000 c.p.s.) vibration testing apparatus has been primarily brought about by the complex guided missile systems which require highly efficient electronic control systems.

Prior art vibrational testing units have attempted to cope with these modern day problems which require a vibration testing device capable of resonant test frequencies in the range of 5 to 3000 cycles per second and higher. However, due to the inadequate constructions thereof the frequencies of vibration of such prior art devices have been severely limited, thus limiting the utility thereof. The prime problem confronted therewith has been the inability to provide a drive mechanism which has the desired transmissibility in the aforementioned frequency range. In the construction of such drive systems it is desirable to actuate the tested components, which are attached to the actuated test table, only along one axis. The prior art drive systems have a tendency to cause the test table to "cross-talk," that is, the test table has a tendency to move transverse to the desired axial direction. Also, in order to combat the aforementioned undesirable "cross-talk" movements, a stiffer and much heavier driving means is necessitated which functions to decrease the efficiency and effectiveness of the testing apparatus. Furthermore, such prior art systems due to their inadequate drive systems are not capable of providing for the nessitated environmental control surrounding the tested component during all phases of testing.

In contrast to such inefficient prior art type vibrational testing apparatus, the present invention provides an oil film type vibration test table having a tested component secured thereon which table is driven only along one axis. The drive system utilized to achieve this very desirable function essentially comprises a conical drive member between a shaker actuator and the test table which is effective to provide a single point type drive system whereby the center of gravity of the tested component is automatically and precisely positioned on the desired drive axis to thus minimize undesirable "cross-talk."

An object of this invention is to provide a simple and efficient vibration testing apparatus whereby simulation of vibrational operating conditions for tested components in the range of 5 to 3000 cycles per second and higher may be easily achieved while yet substantially meeting 100% transmissibility requirements.

Another object of this invention is to provide a new and improved vibrating test table employing novel conical drive means operative to automatically seek and position the center of gravity of a tested component and actuate the tested component with extreme freedom in a chosen direction while effectively damping out unwanted vibrations in other directions.

A further object of this invention is to provide a vibration testing apparatus with environmental chamber means whereby during vibrational testing of a component, such component may be accurately subjected to selectively controlled surrounding environmental conditions.

A still further object of this invention is to provide a vibration testing apparatus having a test table which is adapted by means of a highly efficient balancing system to have a tested component precisely positioned thereon.

These and other objects of the invention will become apparent from the following description taken in connection with the accompanying drawings, in which.

The purpose of this invention is to provide an efficient and reliable vibration testing apparatus comprising a truncated cone type single point center of gravity seeking drive means which is operatively connected to an oil film supported test table which table is adapted to have the tested component precisely secured on the drive axis of the single point conical drive means. Environmental control means are operatively associated with the drive table and tested component so as to provide close control of the environmental conditions therearound.

Figure 1:
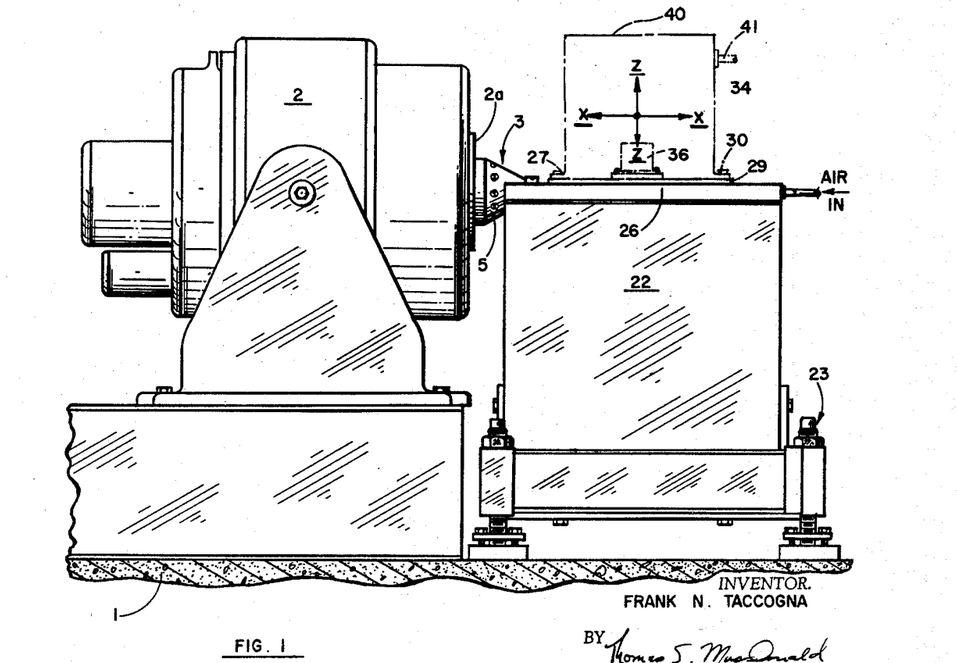
FIG. 1 is a side elevation view of a form of the vibration testing apparatus illustrating the invention and showing in phantom lines a component to be tested secured thereto surrounded by an environmental chamber.

In the embodiment illustrated in the drawings the testing apparatus comprising this invention is shown in FIG. 1 as resting on a suitable foundation 1. The hereinafter described vibration testing apparatus may be deemed to essentially comprise a motor drive means 2, an interconnecting driving means 3, and driven test table means 4 having attachments secured thereto. The motor drive means 2 may be of any conventional type having a shaker head 2a wherein the driven means 4 is actuated back and forth only along one axis. Patent No. 2,862,385 issued to L. R. Woods discloses such a state-of-the-art motor drive means which may be conveniently employed herein. The shaker head 2a which in the preferred embodiment comprises an armature of motor drive means 2 is operatively connected to the driven means 4 by the interconnecting driving means 3 which will also be hereinafter referred to as the conical drive means.

Figure 2:
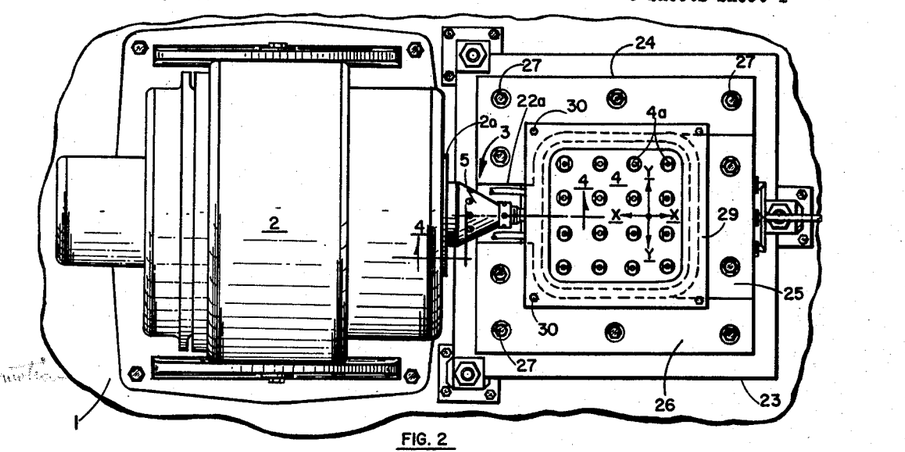
FIG. 2 is a top plan view of the vibration testing apparatus of FIG. 1, wherein the tested component and surrounding environmental chamber shown in FIG. 1 have been removed for the sake of clarity.

The conical drive means 3 is utilized to assure actuation of the test table 4 only along the "X" axis as viewed in FIGS. 1 and 2. Such an ideal vibration signal assures limited vibration signals in the "Y" axis (FIG. 2) and "Z" axis (FIG. 1). Also, such an ideal output signal provides for a minimum loss of transmitted force and very little distortion while still providing a system having a resonant frequency of 3000 cycles per second or more. A further novel aspect of the conical drive means 3 is the center of gravity seeking aspect thereof, that is, should the center of gravity of the tested component be initially positioned slightly off the "X" axis, the conical drive means is inherently operative to automatically seek the center of gravity of the component and place the same precisely on the "X" axis. Such a desired function is primarily afforded due to the hereinafter theoretically explained force focusing feature provided by the herein employed conically shaped drive means.

To fully understand the manner by which the present invention and in particular the conical drive means 3 provides for such an ideal output, as above described, the following theoretical analysis should be noted. The following formula which is set forth for theoretical explanation purposes is specifically directed to drive rods which are circular in cross-section and essentially comprises a theoretical formula applicable to other shaped drive rod cross-sections:

$$\frac{D^2}{L} = \frac{16\pi f_0^2 W_e}{E_g} \quad (1)$$

$$W_e = \frac{W_1 W_2}{W_1 + W_2} \quad (2)$$

wherein:

$D$ = Diameter of the drive rod (in.)
$L$ = Length of the drive rod (in.)
$f_0$ = Resonant frequency (c.p.s.)
$E$ = Modulus of elasticity of the interconnecting driving means (p.s.i.)
$g$ = Gravitational constant (in./sec.$^2$)
$W_1$ = The weight of the dynamic portion of the motor drive means (lb.)
$W_2$ = The weight of the driven test table means and any attachments secured thereto (lb.)

From the above stated Equation 1 it is apparent that for any given table and equipment weight ratio $W_e$, the resonant frequency $f_0$ is proportional to the square root of the ratio of the drive rod diameter $D^2$ to the length $L$. Therefore, a short, fat drive rod and/or lightweight table are preferred. Either one of these solutions would inherently create connecting and/or package size and weight limitation problems. Another solution would be to employ a short, flat rod which construction would satisfy the cross-sectional area requirement in the above formula. These solutions as proposed to the herein discussed problem have the undesirable characteristics of: (1) having a low resonant frequency in the "X" axis (FIG. 1) which in turn affects low transmissibility and is conducive to distortion; (2) creating alignment problems; (3) incurring connection problems, and (4) imparting feed "cross-talk" from the shaker head 2a to the test table 4 in a plane parallel to the table top.

In contrast thereto the present invention provides a near ideal interconnecting drive system which affords: (1) a single point drive system in order to dampen shaker head "cross-talk" in the "Y" and "Z" axes (which suggests symmetry); (2) a resonant frequency which is approximately 15% higher than the anticipated upper frequency limit in order to obtain substantially 100% transmissibility; (3) sufficient interconnecting length of such simplified construction to provide for expeditious connection of the shaker head 2a of the drive motor 2 to the driven test table 4; (4) satisfying total weight requirement ($W_e$), above stated; and (5) prevention of "thread-slop" between the driving and driven members which "thread-slop" would function to distort the desired vibration signal.

Figure 3:
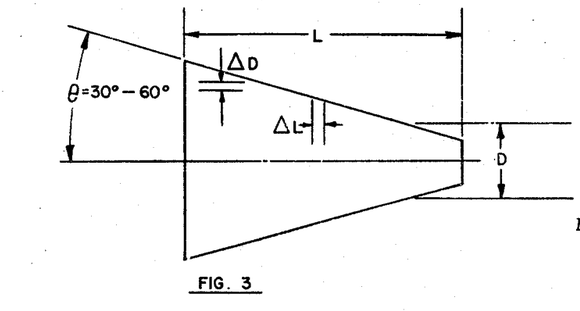
FIG. 3 is a showing of a conically shaped member used to emphasize the novel theoretical concepts of this invention.

The conically formed interconnecting drive member of this invention meets all the above stated requirements and in particular assures substantially 100% transmissibility. As shown in FIG. 3 taken in view of Formula 1, above stated, it is noted that the diameter D of the conical drive member varies uniformly with the length L. As an increment of the cone cross section goes into resonance, increments of the cone cross section on either side thereof are not in resonance due to the change in D of $\Delta D$. Therefore, the increments on either side of $\Delta L$ oppose the mechanical resonance of the increment $\Delta L$.

The angle $\theta$ as also shown in FIG. 3 should be formed so that the ultimate stress of the drive cone material is not exceeded and should be such that the resonant frequency requirements of the drive system are met. In practical experimental application it has been found that when the angle $\theta$ is constructed between 30° and 60° that such a preselected angle will meet most test requirements and thus provide for efficient energy transmission from the shaker head 2a to the test table 4 during any one specific testing application.

Figure 4:
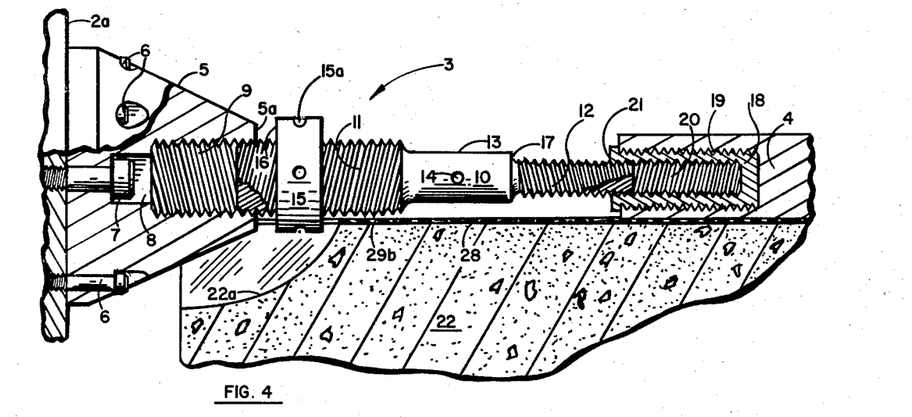
FIG. 4 is a view taken of the line 4—4 of FIG. 2 showing the elements of one conical drive system embodiment in partially disassembled relationship.
Figure 5:
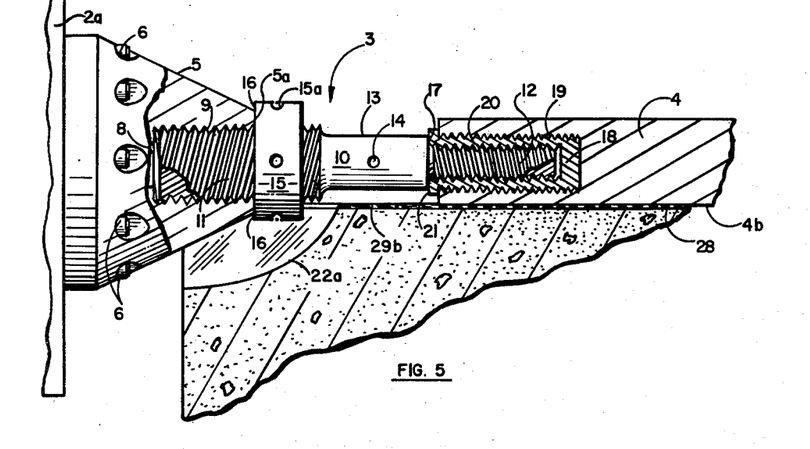
FIG. 5 is a view of the conical drive system shown in FIG. 4 with the elements thereof in assembled operative relationship.

FIG. 4 specifically discloses a typical embodiment of the partially disassembled interconnecting means 3 prior to final testing relationship of the therein disclosed elements. FIG. 5 discloses the interconnecting means 3 in final operative condition. A truncated conical drive member 5 predeterminately constructed according to the hereinbefore set forth theoretical analysis is secured at its base end to the shaker head 2a of drive motor 2 by eight circumferentially spaced bolts 6 and one centrally positioned bolt 7. A passage 8 formed on the central axis of conical drive member 5 is adapted to receive the bolt 7 and is further provided with an internally threaded portion 9 formed at the apex end of the drive member.

A rod or screw member 10 having oppositely formed standard threads 11 and 12 thereon (left and right hand, respectively) functions to connect the truncated apex end of the conical drive member 5 to the test table 4. The oppositely formed threads 11 and 12 are operative to effect a drawing together of conical drive cone members 5 and driven table 4 when the interconnecting screw member 10 is rotated in the desired direction. The screw member 10 has a portion 13 formed thereon having a recess 14 adapted to receive a conventional torque imparting type tool therein for selective rotational actuation. The portion 13 may be alternatively formed, for example, in the shape of a hexagonal nut adapted to receive a conventional open-end torque wrench thereon for the selective turning of screw member 10. As will be hereinafter stated, since the inherent flexibility of the system is a function of the length and the cross-sectional area of portion 13 the preselected design thereof will determine such flexibility after the substantially 100% transmissibility has been achieved.

An internally threaded lock collar member 15 surrounds and threadably mates with the threaded portion 11 of screw member 10. As will be hereinafter explained, collar member 15 is operative to axially force camming surface 16 thereof against the bearing surface 5a of conical drive member 5 so as to effect positive rigidity between the driving and driven members. A plurality of torque wrench recess adapters 15a are provided to selectively effect an axial actuation of collar member 15. A camming surface 17 formed on portion 13, the complete function of which will be hereinafter explained, also cooperates with the interconnecting drive means to assure positive rigidity thereof.

According to the preferred embodiment of this invention the driven test table 4 is formed of a relatively lightweight metallic material such as aluminum. Therefore, in order to adapt such a low-tensile strength type material for the receiving of screw member 10, a steel bushing 18 is externally threaded into the table at 19 to fulfill such a function. The bushing 18 is provided with internal threads 20 adapted to cooperate with the threaded portion 12 of the screw member 10 to maintain the screw member in set position. A bearing surface 21 formed on the bushing 18 is co-axially positioned with respect to the camming surface 17 of collar portion 13 for maintaining the right hand portion of screw member 10 in set position when the system is in operative condition. Conventional steel type insert assemblies 4a are utilized in the disclosed embodiment of this invention since as previously explained, test table 4 is preferably constructed of a relatively low-tensile strength material.

FIG. 5 discloses the interconnecting means 3 with the elements thereof in final testing relationship. Such a final assembled relationship is initiated by actuating the screw member 10 until the cam surface 17 formed on portion 13 presses axially against the bearing surface 21 formed on bushing 18 so as to afford a positive locking function thereat. It is to be noted that the test table 4 is initially positioned a predetermined distance from the shaker head actuator 2a as shown in FIG. 4 and after the selected actuation of screw member 10 the table is drawn to the shaker head actuator as shown in FIG. 5. Subsequent to the initial actuation of the screw member 10 the lock collar member 15 is selectively actuated by positioning a torque wrench in recess 15a so as to axially force camming surface 16 thereof against the bearing surface 5a of conical drive member 5 to thereby complete the desired locking function.

As hereinbefore stated it is desirable to construct the aforementioned theoretically computed angle $\theta$ (FIG. 3) between a minimum angle of 30° and a maximum angle of 60° depending on the specific test application. The above discussed FIG. 4 and FIG. 5 embodiment discloses a conical drive member 5 constructed with an angle $\theta$ of approximately 30°. It is to be noted that such a drive system combination is designed to allow a predetermined desired limited movement of the test table 4 in the "Y" axis direction with respect to the "X" axis without sacrificing the desired transmissability. In many test applications wherein the driven test component weight is at a selected minimum, a relatively slender and consequently flexible type interconnecting drive rod portion 13 is desired.

Figure 6:
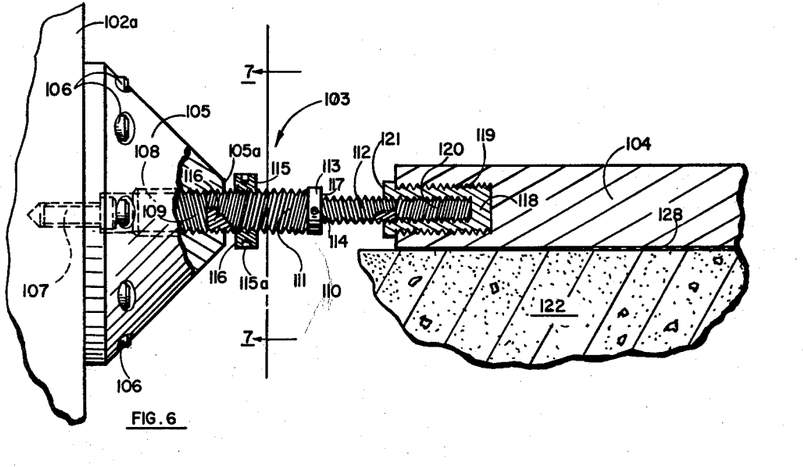
FIG. 6 is a view similar to FIG. 4 and FIG. 5 disclosing an alternative embodiment of the conical drive system.
Figure 7:
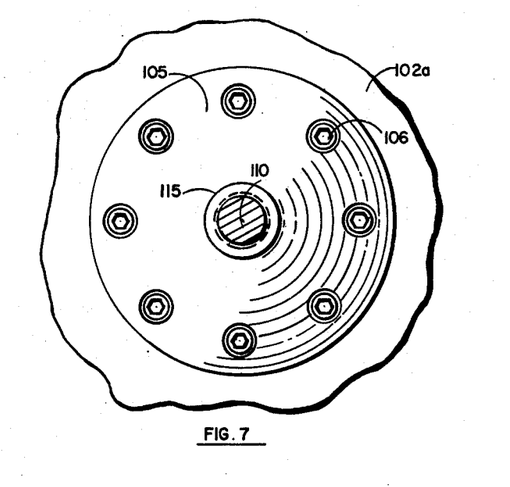
FIG. 7 is a view taken on line 7—7 of FIG. 6.

The alternative embodiment of FIG. 6 and FIG. 7 discloses an interconnecting drive means 103 comprising an assemblage of partially disassembled elements which are constructed and arranged to provide substantially the same functional relationships as the like elements disclosed in the FIG. 4 and FIG. 5 embodiment. As shown in FIG. 6 the like elements comprise a drive motor shaker head 102a; a conical drive member 105 connected to the shaker head by eight circumferentially spaced bolts 106 and one centrally located bolt 107; a passage 108 having internal threads 109 formed therein; a screw member 110 having oppositely formed threads 111 and 112 and a portion 113 with recesses 114 and camming surface 117 formed thereon; and a lock collar member 115 threadably mounted on the screw member and having a camming surface 116 formed thereon operative to be forced in locking engagement with bearing surface 105a. Such an assemblage of elements, like the hereinbefore described FIG. 4 and FIG. 5 embodiment, is constructed and arranged so as to be expeditiously operatively secured to an actuated test table 104. A bushing member 118 is secured to the test table by external threads 119 and has internal threads 120 formed therein adapted to receive the threaded portion 112 of screw member 110. The camming surface 117 of portion 113 is co-axial with the bearing surface 121 formed on the bushing 118 to retain the screw member 110 relative to the actuated test table.

It should be particularly noted that the angle $\theta$ of the conical drive member 105 is approximately constructed at the hereinbefore discussed maximum angle of 60°. It is to be further noted in the alternative embodiment, that the distance between the driven test table 104 and the actuator 102a, is small as compared to that shown in the embodiment of FIG. 4 and FIG. 5. Such a relatively rigid conical drive means constructional relationship provides for less initial "cross-talk" in the "Y" axis providing a testing apparatus whereby relatively heavy components may be effectively tested without damaging the system.

It is apparent that the provision of such a positively locked truncated conical drive means 3 and actuated test table 4 combination essentially affords a single point drive system effective to substantially maintain the drive motion only along "X" axis as viewed in FIG. 1 and FIG. 2. Such a conical drive means 3 effectively focuses the forces transmitted to the driven member by the shaker member 2a substantially through the point wherein the conical drive member 3 connects with shaker table 4. As hereinbefore stated, the ultimate effect is one of assuring proficient actuation of the test table 4 and attached equipment only along the "X" axis. Undesirable movements of the test table and attached equipment in the "Y" and "Z" axis are thereby minimized.

Referring once again to FIG. 1 and FIG. 2, the driven test table 4 is mounted on a base member 22 constructed of relatively dense material which in the preferred embodiment comprises granite. A cut-out portion 22a more clearly shown in FIG. 5 is formed in the table to prevent contact between the base member and the outside diameter of the conical drive member 5. The clearance provided between the conical drive member 5 and the base 22 should be such that a predetermined increment of motion may be afforded the conical drive member along the "X" axis without causing a binding effect therebetween while still providing a combination whereby the test table 4 may be closely drawn to the shaker actuator 2a. The granite base member 22 is in turn mounted in a conventional type support bracket member 23 which is fixedly secured to the foundation 1. A frame member comprising sections 24, 25 and 26 is secured to base member 22 by recessed bolts 27 and functions to laterally and longitudinally confine the test table 4.

As more clearly shown in FIG. 4 and FIG. 5 the lower surface 4b of test table 4 is mounted on the top surface 22b of support base 22 with a thin film of low-friction type constituent 28 therebetween. In the preferred embodiment of this invention such a constituent 28 comprises a standard grade of oil. The selection and in particular the viscosity of such a low-friction type constituent is predicated on the specific work application.

Figure 8:
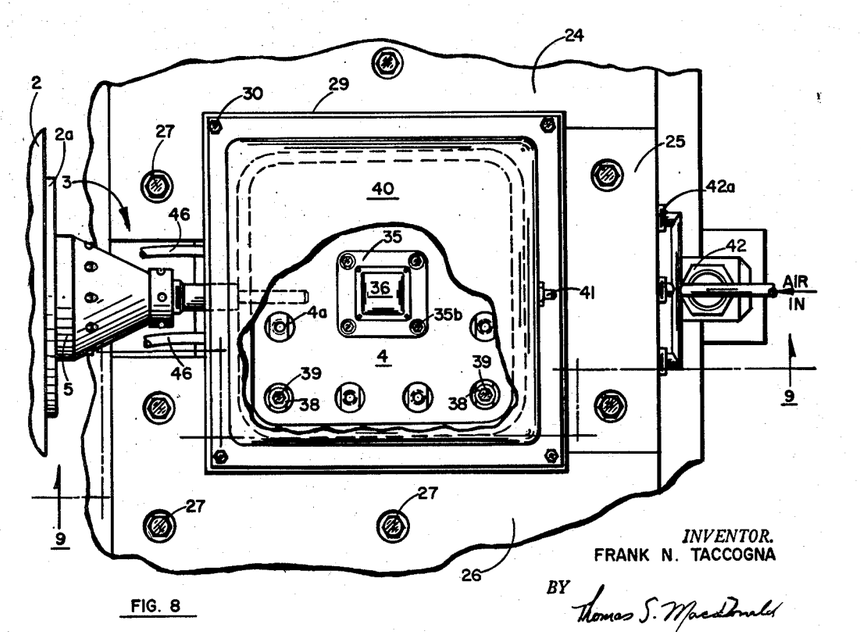
FIG. 8 is a top plan view similar to FIG. 2 with the component to be tested secured thereto and surrounded by an environmental chamber with a portion thereof cut away.
Figure 9:
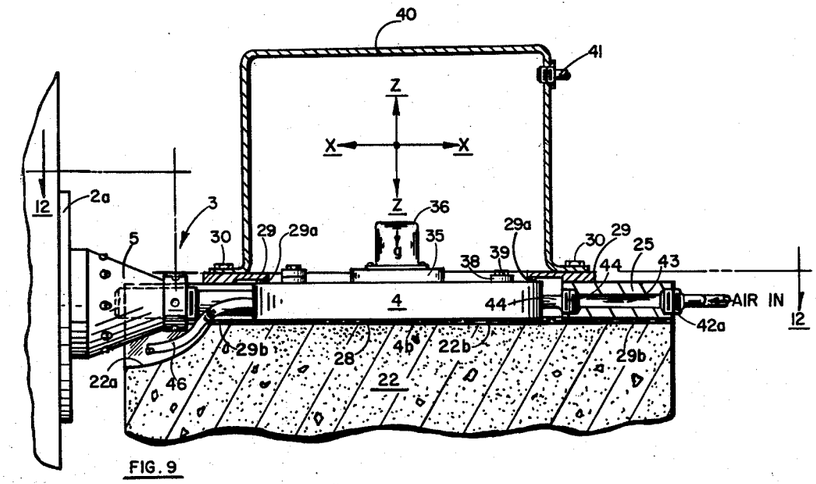
FIG. 9 is a view taken on line 9—9 of FIG. 8.

Referring now to FIG. 8 and FIG. 9 a frame 29 is secured by bolts 30 to the sections 24, 25, and 26. As will be hereinafter explained the bolts 30 may also be utilized to secure a test chamber 40 on the frame 29 which chamber is operative to confine a controlled environment around a tested component 36. A pad 29a preferably constructed of a felt material in the disclosed embodiment is secured by conventional means to the underside of the frame 29. The pad 29a is positioned between the sliding test table 4 and the frame 29 so as to protect the oil 28 against contamination. A peripherally continuous gasket member 29b, preferably constructed of a rubber-based material or the like, circumferentially encircles the work table 4 and contains the oil film 28. The gasket member is pressed between the frame structure 24, 25 and 26 and the base member 22 so as to prevent lateral escapement flow of the oil 28. As more clearly shown in FIG. 5 the height of the gasket should be slightly more than the height of the oil film 28 to fulfill such a function. It is to be noted in FIG. 9 that a portion of the gasket 29b is maintained between the cut-out portion 22a of base 22 and the oil 28 to prevent the escapement of the oil at the conical drive means 3 juncture.

With the hereinbefore described test table 4 construction it is to be noted that the test table is free to slide within the frame structure provided by sections 24, 25 and 26 and is also adapted to slide under the frame member 29 while retaining the oil film 28 thereunder. Such a construction further assures a test table system which is thereby protected from contaminated surrounding environments. It is to be further noted that since the bearing surface 4b (FIG. 5) of the test table 4 and the bearing surface 22b of the support base 22 are very flat (±.0003 in.), the cohesion effect between the test table 4 and the relatively dense support base 22 is very high when the intermediate oil film layer 28 is placed therebetween. Such an extreme cohesion type attractive effect is very desirable in aiding the positive retention of the test table during planar actuations thereof.

Figures 10, 11:
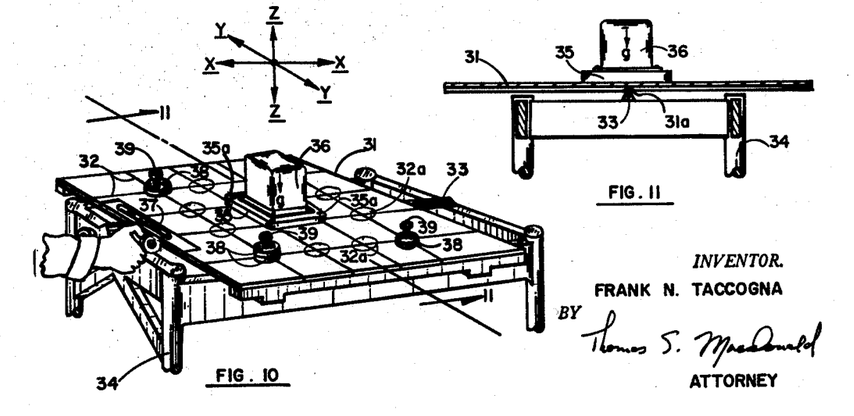
FIG. 10 is a schematic view of a balancing table system utilized to precisely position the component to be tested on the test table of the vibration testing apparatus of FIG. 1.
FIG. 11 is a sectional view taken on lines 11—11 of FIG. 10 more specifically disclosing the means for pivoting the balancing table.

FIG. 10 depicts the balancing system utilized to accurately position the center of gravity "g" of the tested equipment on the work table 4. Since the test table 4 is precisely fabricated so as to afford an equal distribution of the weight thereof about the "X" axis, it only remains necessary to accurately position the tested component assembly thereon. As hereinbefore stated, the philosophy of the system is predicated on the actuation of a driven load which is symmetrically balanced (approximately) about the "X" axis (in the "Y" axis direction) as shown in FIG. 2. Such a balancing step will substantially position the center of gravity "g" of the driven weight over the "X" axis which denotes the desired direction of actuation. The relative weight distribution of the driven load about the "Y" and "Z" axes is essentially immaterial. The hereinafter described balancing table efficiently provides for such a necessitated symmetrical balancing step. It is to be again reiterated that by employing the hereinbefore described conical drive means, such as drive means will automatically seek the center of gravity "g" of the tested component when such a center of gravity is initially slightly misaligned.

As disclosed in FIG. 10 a balancing table 31 has a grid system 32 formed thereon conforming to the geometric centers of the insert assemblies 4a on test table 4. As more clearly shown in FIG. 11, a groove 31a is formed in the balancing table 31 and is pivoted on "knife" type balancing assembly 33 secured to a stationary frame 34 of the balancing system. A standard mounting plate 35 with the specimen or tested component 36 previously attached thereto, as shown, is positioned on the table 31 with the ultimate desired condition being that the additive weight of the mounting plate 35 and specimen 36 is symmetrically distributed about the "X" axis as defined by an imaginary line coincident with the knife edge of the balancing assembly 33. It is to be noted that four recessed adapter holes 35a are formed in the mounting plate and precisely positioned over the applicable line intersections forming the grid system to thus facilitate ultimate securance thereof to the corresponding threaded bushing insert assemblies 4a on test table 4. Since the present embodiment discloses four bolts 35b utilized to secure the mounting plate to the test table 4 and since two equally weighted bolts are positioned on either side of the "X" axis, it is obvious that such bolt weights need not be taken into account during the balancing step.

Unbalanced specimen condition is readily observed on a conventional bubble type level gage or indicator 37 incorporated in the balance table 31. Standard weight members 38 of varying thickness, but having standard diameters are positioned over the applicable circles 32a of equal diameter inscribed on the surface of table 31 at the intersection of the lines forming the grid system 32. The weights are formed as washers and a threaded bolt member 39 is provided for subsequently positively securing the weights to the test table 4 by means of the internally threaded bushing insert assemblies 4a as shown in FIG. 8 and FIG. 9. The standard weights 38 are added to the table until a condition of balance as indicated by the level gage 37 is achieved.

It should be noted that the bolts 39 are placed through the holes formed in the washer type weights 38 since their weight must also be included in determining balanced condition. When an ideal balanced condition about the "X" axis is achieved the standard mounting plate 35 carrying the positively secured tested component 36 is transferred and secured to the test table 3 as shown in FIG. 8 and FIG. 9.

As hereinbefore stated, the standard mounting plate 35 comprises four peripherally disposed holes 35a formed therein conforming to the hole pattern denoted by the four centrally located threaded bushing inserts 4a of test table 4. Only sixteen threaded insert members 4a have been shown for illustration purposes however, it should be noted that any number thereof may be employed depending on the specific work assignment. Also, the number and relative positioning of the holes 35a formed in the standard mounting plate 35 is a matter of choice depending on the specific work assignment prescribed by the hole pattern denoted by the threaded bushing inserts 4a on test table 4.

The hereinbefore described vibration testing apparatus which comprises the preferred embodiment of this invention provides an additional advantage in that during vibrational testing of a component, control means may be conveniently provided whereby such component may be accurately subjected to selectively controlled surrounding environmental conditions. FIG. 8 and FIG. 9 disclose a test chamber 40 secured to the frame 29 by bolts 30 comprising one form of an environmental test control means which may be positioned over the test specimen so as to provide controlled ambient environmental conditions therearound. Such a cover type environmental chamber may have selectively controlled environments injected therein through convenient type entrance means such as the piped fitting shown at 41. Other types of conventional environmental control devices may be utilized such as an accurately controlled resistance type heating element strategically positioned on the interior of the chamber 40.

Figure 12:
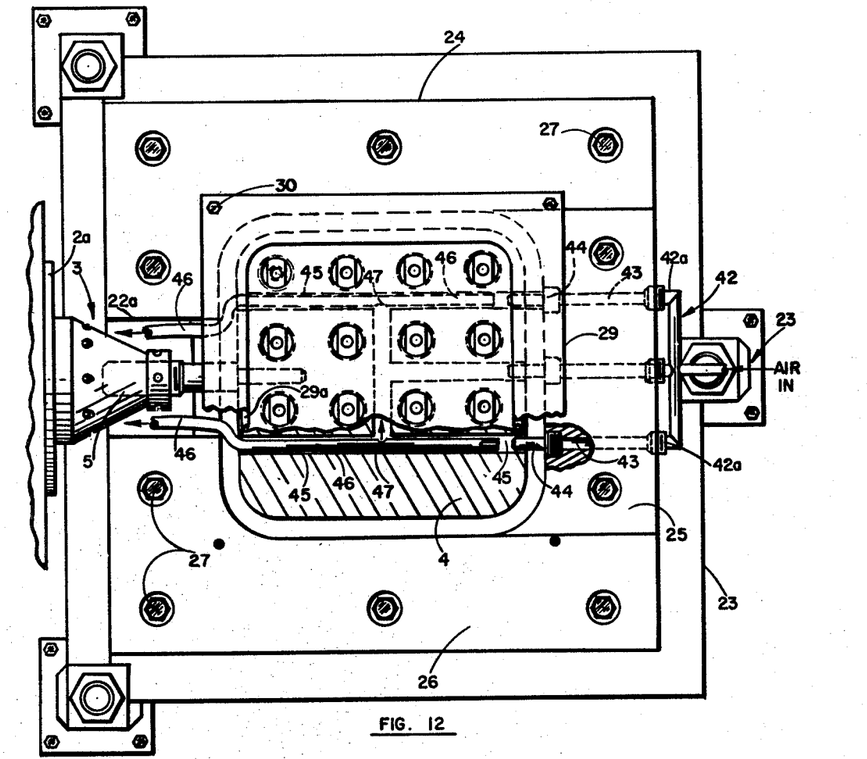
FIG. 12 is a view taken on line 12—12 of FIG. 9.

It should be noted that should the controlled environment contained in the environmental chamber 40 be extremely cold or extremely hot, further means must be provided to cooperate therewith for preventing undesirable warpage of test table 4. A preferred embodiment of such a cooperating control means is shown in FIG. 12. The main function of the therein disclosed structure is to provide a means whereby the severe hot or cold nature of the actuated test table 4 may be accurately controlled.

As shown in FIG. 12 a T type pipe construction is shown at 42 and is adapted to be connected to a conventional type air pump means, for example, to effect an injection of air therethrough. Three exit ports 42a formed in the T type pipe construction 42 cooperate with three passages 43 formed in section 25 of the frame member. Three transfer pipe members 44 are threadably connected to the section 25 and cooperate with the passages 43 to transfer the air therethrough. The transfer pipes 44 further cooperate with three longitudinal passages 45 formed in the test table 4. It is to be noted that the outside diameters of pipe 44 are such so as to provide a sufficient clearance between the walls of passages 45 so that such pipes do not create frictional drags during actuation of the test table 4. It is to be further noted that such a clearance must be sufficient to permit slight test table "crosstalk" before the hereinbefore discussed center of gravity seeking function is achieved. The length of the pipe members 44 must be sufficient to contain the air injecting end thereof in the longitudinal passages 45 during all predetermined "X" axis movements of the test table.

One problem encountered with such a system is that the heat transfer media, generally air, comprises a percentage of humidity which would cause disasterous effects should such a constituent be mixed or emulsified with the oil film 28 on which the test table 4 is mounted. Such an undesirable mixing of the oil and water would function to destroy the effectiveness of the sliding action which necessarily occurs between the test table 4 and the support base 22. To solve this problem the preferred embodiment of this invention utilizes a very thin walled highly flexible tubing 46 inserted in two of the passages 45. As shown in FIG. 12 the tubes 46 are positioned therein so as to cooperate with the pipes 44 and thus carry and dump the air adjacent the groove 22a which is formed in the base 22. With such a construction the condensation is free to flow down the groove 22a and onto the floor or into a strategically positioned container. The thin walled flexible tubes 46 have passages 47 formed therein so as to effect a maximum heat exchange system as shown. It is to be especially noted that by the very constructional make-up of the flexible tubing 46, a negligible amount of drag is imparted to the test table 4 during actuation thereof.

The specific arrangement of the aforedescribed heat transfer passageway system 45 will of course depend on the specific work application. It is to be further noted that the passages 45 which are formed in the actuated test table 4 also function to decrease the weight thereof which decrease in test table weight has proved advantageous, since component weight limits are raised. If so desired further passageways may be employed for lightening functions and/or heat transfer functions. With such a structure it is to be again noted that should the table become extremely hot or cold, the temperature of the injected air therethrough may be closely controlled to bring the same to the desired temperature and thus prevent warpage thereof. The size of such passageways also depends on the specific work application.

Although the invention has been described and illustrated in detail, it is to be understood that the same is by way of illustration and example only and is not to be taken by way of limitation the spirit and scope of this invention being limited only by the terms of the appended claims.

I claim:
1. A vibration testing apparatus comprising:
   drive means for imparting back and forth motion along one axis;
   driven means comprising an upper surface having a tested component secured thereto, the weight of said component substantially equally distributed on either side of said axis and whose center of gravity is adapted to be driven by said drive means along said axis;
   interconnecting means operatively connecting said drive means and said driven means for automatically aligning and driving the center of gravity of said tested component along said axis, said interconnecting means comprising a conically shaped member having its base end portion connected to said driving means and its apex end portion connected to said driven means, said member providing outer surface portions between said base and apex end portions which form an angle selected from the range of from 30° to 60° with respect to said axis; and environmental control means cooperating with said driven means and further cooperating with the tested component secured thereto for accurately subjecting said driven means and tested component to selectively controlled environments without affecting the operational function of said testing apparatus, said environmental control means comprising a frame member constructed and arranged to overlap peripheral portions of the upper surface of said driven means and a chamber secured to said frame member and enclosing said driven means and tested component.

2. The invention of claim 1 further comprising means forming a plurality of interconnecting passages in said driven means and control means operatively connected with said passages for maintaining said driven means at a predetermined temperature.

3. A vibration test apparatus comprising:
   a base member,
   driven means for imparting back and forth driving motion along one axis,
   driven means supported on said base member, said driven means having a plurality of cooling passages extending from a first end to a second end thereof,
   a first conically-shaped interconnecting means having its base end portion connected to said drive means, the apical angle of said interconnecting means being in the range of 60° to 120°,
   a second interconnecting means having one end connected to the apex end portion of said first interconnecting means and its other end connected to said driven means,
   an environmental chamber mounted on said base member and substantially surrounding said driven means, said chamber having an opening at one side thereof, said driven means passing through said opening and said second end of said driven means being outside said chamber throughout the back and forth motion of said driven means,
   seal means arranged to seal the portion of said opening between said driven means and said chamber,
   means for controlling the environment within said chamber,
   and means for forcing fluid through said cooling passages in said driven means.

4. Apparatus as claimed in claim 3 including means for balancing said driven means along a longitudinal aixs thereof that is substantially coincident with the axis of said drive means, said means comprising a plurality of weights and means for securing said weights to said driven means at points lateral to said longitudinal axis thereof.

5. A vibration testing apparatus comprising a driving means, an interconnecting means and a driven means; said driving means comprising: a shaker actuator adapted for back and forth movements along one axis; said interconnecting means comprising: a truncated cone member having its base portion secured to said shaker actuator and a bearing surface formed on the other end thereof; a threaded portion formed in said cone member on the central axis of said cone member; a screw member having oppositely formed first and second threaded portions on opposite ends thereof; said first threaded portion threadably engaged with the threaded portion formed in said cone member; an internally threaded lock collar member threadably mounted on said first threaded portion; a camming surface formed on said lock collar member axially opposed to the bearing surface of said cone member; a portion formed on said screw member intermediate said first and second threaded portion having a camming surface formed thereon; said driven means comprising: a test table having an upper surface which is adapted to be actuated in a predetermined plane; a bushing threadably secured to said test table having internal threads axially opposed to the second threaded portion of said screw member and threadably engaged therewith; a bearing surface formed on said bushing axially opposed to the camming surface formed on said screw member.

6. The invention of claim 5 wherein said test table is constructed of a material of relatively low density and the lower surface thereof is slidably mounted on a stationary base constructed of a material of relatively high density and wherein a thin film of low friction type oil is intermediate said test table and said base so as to facilitate sliding movements therebetween.

7. A vibration testing apparatus comprising drive means for imparting back and forth driving motion along one axis, a support, a driven member slidably mounted on the support and connected to the drive means to be reciprocated thereby, said driven member including a portion for mounting articles to be tested and a continuous peripheral planar portion circumscribing said portion for mounting articles, and environmental control means for accurately subjecting the driven member and articles to be tested thereon to selectively controlled environments without affecting the operation and function of the apparatus, said environmental control means comprising a sealed chamber carried by the support and having wall means in sliding and sealed engagement with said continuous peripheral planar portion of said driven member.

References Cited in the file of this patent

UNITED STATES PATENTS 2,573,168    Mason et al. ____________ Oct. 30, 1951

OTHER REFERENCES

Table Motion Problems in Electrodynamic Vibration Exciters, by Karl Unholtz, MB Vibration Notebook, vol 1, No. 3, December 1955.

Vibration Testing 24 Miles Above Sea Level, by Donald S. McCluskey, MB Vibration Notebook, vol. 2, No. 1, July 1956.

General Electric Tests Jet Plane Drive Unit at MB, MB Vibration Notebook, vol 4, No. 5, December 1958.

Random Noise Vibration Test Procedure, by Wilbur Du Bois, MB Vibration Notebook, vol. 5, No. 1, February 1959.

Vibration Testing in a Combined Environment, by J. D. Newton, MB Vibration Notebook, vol. 5, No. 1, February 1959.